United States Patent [19]

Sauvée

[11] Patent Number: 4,712,655
[45] Date of Patent: Dec. 15, 1987

[54] BRAKE ACTUATOR WITH AUTOMATIC ADJUSTMENT

[75] Inventor: Jean-Paul Sauvée, Aubervilliers, France

[73] Assignee: Bendix France, Paris, France

[21] Appl. No.: 45,717

[22] Filed: May 6, 1987

Related U.S. Application Data

[63] Continuation of Ser. No. 818,460, Jan. 13, 1986, abandoned.

[30] Foreign Application Priority Data

Jan. 25, 1985 [FR] France .................. 85 01027

[51] Int. Cl.⁴ .................................. F16D 65/56
[52] U.S. Cl. ................... 188/196 D; 188/71.9; 192/111 A
[58] Field of Search .......... 188/196 D, 71.9, 79.5 GE, 188/79.5 GC, 79.5 S; 192/111 A

[56] References Cited

U.S. PATENT DOCUMENTS

| | | | |
|---|---|---|---|
| 3,068,964 | 12/1962 | Williams et al. | 188/196 D X |
| 3,809,189 | 3/1974 | Farr | 188/71.9 |
| 3,952,845 | 4/1976 | Asquith | 188/196 D |
| 4,064,973 | 12/1977 | Deem et al. | 188/71.7 |
| 4,085,830 | 4/1978 | Bottoms | 188/196 D |
| 4,256,206 | 3/1981 | Maehara | 188/71.9 |
| 4,351,419 | 9/1982 | Garrett et al. | 188/71.9 |
| 4,378,863 | 4/1983 | Baum | 188/71.8 |
| 4,394,890 | 7/1983 | Kleinhagen, Jr. | 188/71.9 |
| 4,499,976 | 2/1985 | Weber | 188/71.9 |

FOREIGN PATENT DOCUMENTS

| | | |
|---|---|---|
| 0145535 | 6/1985 | European Pat. Off. . |
| 2330949 | 1/1974 | Fed. Rep. of Germany . |
| 2644212 | 4/1977 | Fed. Rep. of Germany . |
| 2724129 | 11/1978 | Fed. Rep. of Germany . |
| 2741365 | 3/1979 | Fed. Rep. of Germany . |
| 2835305 | 2/1980 | Fed. Rep. of Germany . |
| 2150082 | 3/1973 | France . |
| 2388169 | 11/1978 | France . |
| 2063399 | 6/1981 | United Kingdom ........ 188/196 D |

*Primary Examiner*—George E. A. Halvosa
*Attorney, Agent, or Firm*—Larry J. Palguta; Ken C. Decker

[57] ABSTRACT

The invention relates to a brake actuator with automatic adjustment of the type including a screw and nut actuating mechanism (32) the lengthening of which is controlled by a combined system with a screw and nut of reversible pitch and a unidirectional clutch (42) which is responsive to the relative axial movement between a control piston (14) and a fixed body (10) housing the control piston (14). The brake actuator includes a device for controlling (62) the rotation of the nut (34) of the actuating mechanism (32) so as to allow rotation of the nut (34) beyond a predetermined value of torque for rotating the latter.

5 Claims, 2 Drawing Figures

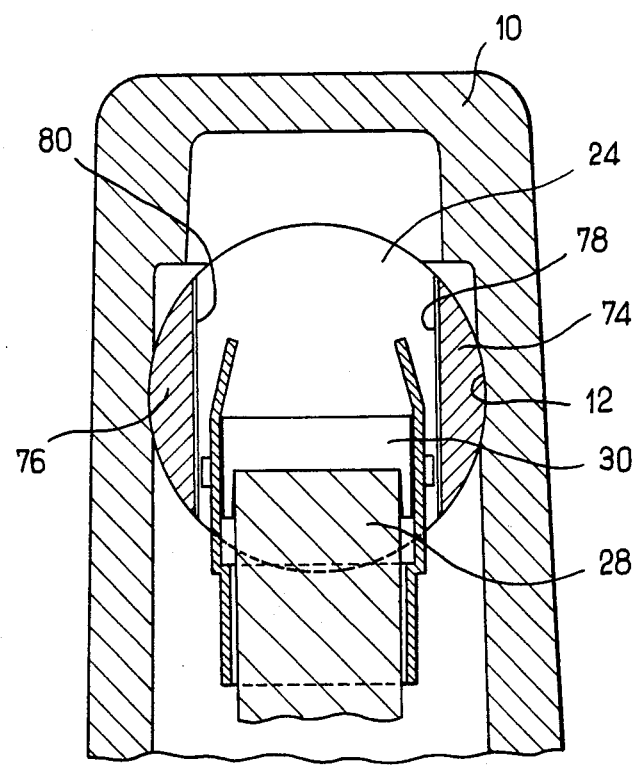
FIG_2

BRAKE ACTUATOR WITH AUTOMATIC ADJUSTMENT

This is a continuation of abandoned application Ser. No. 818,460, filed Jan. 13, 1986.

The invention relates to a brake actuator which is capable of operating a brake particularly for use on motor vehicles.

The invention concerns in particular a brake actuator with automatic adjustment which is intended to compensate automatically for the wear of the friction linings in order to maintain the travel of the brake pedal, and of the mechanical control if the brake is thus equipped, required to actuate the latter at an essentially constant and small value.

A number of brake actuators equipped with an automatic adjustment device are known, such as for example that described in European Pat. No. 0,145,535, published June 19, 1985, in the name of the Applicant Company. In said brake actuator, an automatic adjustment is provided of the type comprising a screw and nut actuating mechanism the lengthening of which is controlled by a combined system with a screw and nut of reversible pitch and a unidirectional clutch which is sensitive to the relative axial movement between the control piston and the fixed body housing the piston. Although satisfactory in the majority of cases, this device is capable of hazardous operation in certain particular cases. One such particular case can arise, for example, when the screw and nut actuator mechanism carries not axial load, this is particularly the case in a disc brake when there is a large clearance between the screw and nut mechanism and the friction component to be actuated. As the friction between the screw and the nut is low, this nut is capable of turning under the effect of the combined system with a screw and nut of reversible pitch and a unidirectional clutch, without putting the latter into operation, and therefore the actuating mechanism is successively slightly shortened when braking is applied and slightly lengthened when braking is released by successive rotations of the nut in one direction and then in the other, the function of the automatic adjustment not having been fulfilled.

The invention proposes a brake actuator with automatic adjustment which does not include the disadvantage mentioned above, and which therefore offers increased reliability.

With this aim the invention proposes a brake actuator with automatic adjustment of the type comprising a screw and nut actuating mechanism the lengthening of which is controlled by a combined system with a screw and nut of reversible pitch and a unidirectional clutch which is sensitive to the relative axial movement between a control piston and a fixed body housing the same control piston, characterized in that the brake actuator comprises a device for controlling the rotation of the nut of the actuating mechanism allowing rotation of the said nut beyond a predetermined value of torque for rotating the latter.

With such an arrangement, rotation of the nut during a braking application can only take place beyond a predetermined torque, which, under all normal conditions of operation, enables the said nut to be immobilized, the screw and nut system with reversible pitch putting the unidirectional clutch into operation in the direction in which the latter allows rotation. As rotation of the nut is controlled, the disadvantage mentioned above is eliminated.

A description follows of an embodiment of the invention by way of an example which is not limiting, with reference to the accompanying drawings in which;

FIG. 2 is a section through the line II—II of the brake actuator shown in FIG. 1.

Figure 1:
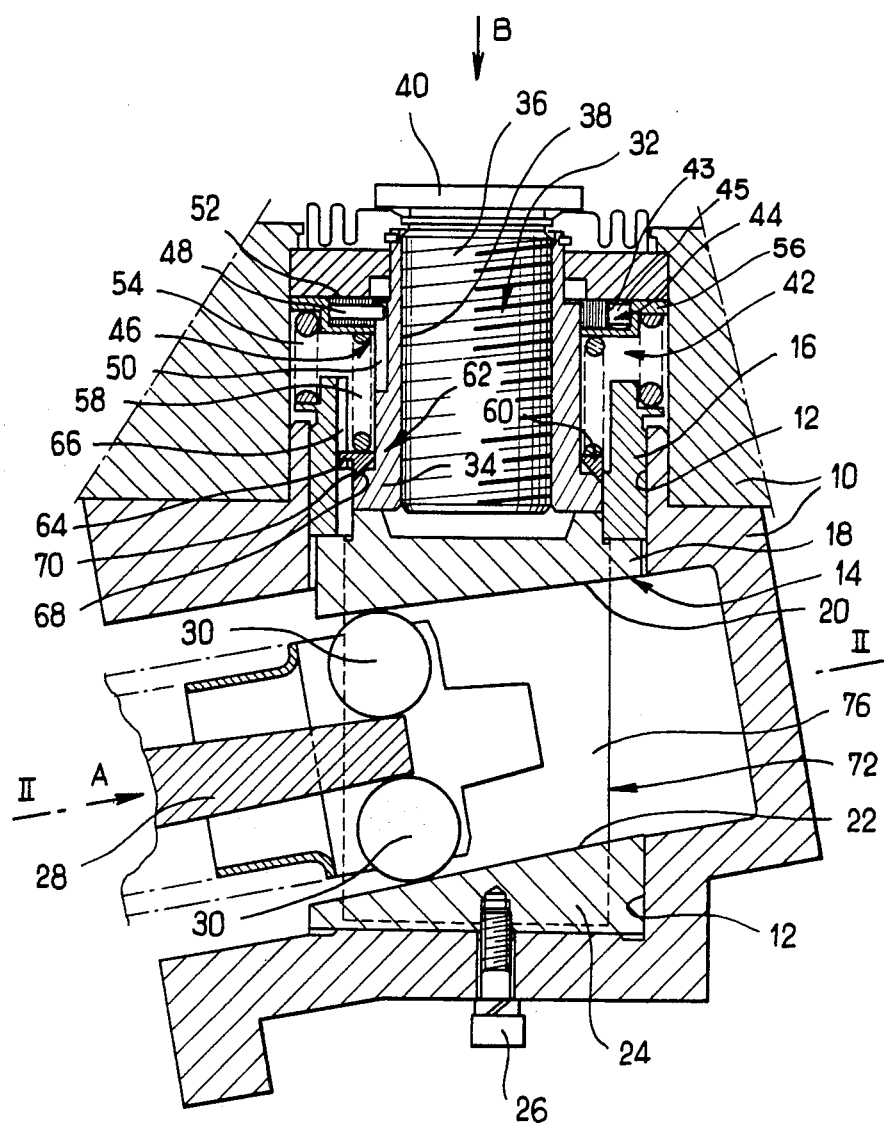
FIG. 1 is a partial view in cross-section of a brake actuator constructed in accordance with the invention.

The brake actuator shown in FIGS. 1 and 2 is of the type which is controlled by a wedge in accordance with an arrangement used particularly in disc brakes. This brake actuator incorporates, in a conventional manner, a body 10 comprising a bore 12 in which a control piston 14 is slideably mounted, the control piston 14 being formed by a sleeve 16 and a pressure component 18 having an inclined surface 20 positioned facing another inclined surface 22 formed on a reaction component 24 which is also mounted in the bore 12 and which is firmly fixed to the body 10 by means of a screw 26. These two inclined surfaces 20 and 22 are capable of being separated by means of a wedge 28 through rollers 30 when the wedge enters the brake actuator in the direction of the arrow A shown in FIG. 1.

Through the intermediary of a screw and nut actuating mechanism given as an assembly the reference 32, the piston 14 is capable of moving an adjacent friction component (not shown) so as to operate the disc brake. This screw and nut actuating mechanism 32 is formed by a nut 34 bearing against the pressure component 18, the nut housing a screw 36 by means of a threaded connection having a non-reversible pitch 38, the screw 36 terminating in a plunger 40 capable of moving the adjacent friction component (not shown). The brake actuator also incorporates a combined system with a screw and nut of reversible pitch and a unidirectional clutch given as an assembly the reference 42. This combined system 42 incorporates a unidirectional clutch given as an assembly the reference 44 and formed in the embodiment shown by a freewheel (carrier component 52) with rollers 45 and ramps 43, the combined system 42 also incorporates a screw and nut system of reversible pitch given as an assembly the reference 46 and formed by fingers 48 which enter into helical grooves 50 formed on the periphery of the nut 34. The fingers 48 are carried by a carrier component 52 which is firmly fixed to the unidirectional clutch 44 and whose rotation is controlled by this unidirectional clutch 44 in the direction in which the grooves 50 push the fingers 48. A first spring 54 is positioned between a guide component 56 which is fixed relative to the body 10 and the sleeve 16 so as to push back the piston 14 in the direction of the arrow B shown in FIG. 1 so as to keep the piston 14 and more precisely the inclined surface 20 in contact with the rollers 30 and the wedge 28. A second spring 58, weaker than the first spring 54, pushes the nut 34 so as to bear against the pressure component 18 through an annular component 60.

According to the invention, the brake actuator includes a device for controlling the rotation of the nut of the actuating mechanism, given as an assembly the reference 62. This control device 62 comprises the annular component 60 which has a projection 64 which enters into an axial groove 66 formed internally in the sleeve 16. The device 62 also has two surfaces 68 and 70 which are frustoconical and coaxial, the one 68 being formed on the nut 34 and the other 70 on the annular component 60, respectively. The spring 58 pushes the two surfaces 68 and 70 against one another in frictional engagement. The control piston 14 is immobilized in rotation relative to the body 10 by means of a fork 72 which is formed on the sleeve 16, by means of two arms 74 and 76 produced by milling the sleeve 16, which is guided in the bore 12 and which passes each side of the reaction component 24, immobilized relative to the body 10 and having flat areas 78 and 80 of a shape which matches the milled slot of the sleeve 16, immobilizing this sleeve 16 and therefore the piston 14 in rotation relative to the body 10. The pressure component 18 is also mounted in the same milled slot which ensures correct relative positioning of the two inclined surfaces 20 and 22.

The operation of the brake actuator is similar in every way to that described in European Pat. No. 0,1435,535, to which reference should advantageously be made, with the exception of the operation of the control device 62 which is detailed below.

When the wedge 28 enters the brake actuator in the direction of the arrow A the piston 14 is pushed back in the opposite direction to the arrow B shown in FIG. 1. The nut 34 by means of its helical groove 50 cooperates with the finger 48 and is pushed progressively in rotation by this finger 48 as the nut 34 proceeds in the opposite direction to the arrow B. As the control device 62, by means of the spring 58 and its two frustoconical surfaces 68 and 70 in frictional engagement, immobilizes this nut 34 in rotation, owing to the projection 64, and the groove 66 and the fork 72, the nut 34 cannot turn, and the fingers 48 are then pushed in rotation along with their carrier component 52 in the direction allowed by the unidirectional clutch 44. When the brake is released, the unidirectional clutch 44 through ramps 43 and rollers 45, prevents rotation of the carrier component 52, and the fingers 48 push the nut 34 in rotation through the helical groove 50, the nut 34 being able to turn in forced rotation against the torque predetermined by the spring 58 and the frictional resistance of the two frustoconical surfaces 68 and 70 to cause the required lengthening of the screw and nut mechanism.

The device for controlling the rotation of the nut 34 thus ensures, when braking is applied, that the unidirectional clutch 44 is put into operation in the permitted direction of rotation without risk of rotation of the nut 34, and when braking is released the resistant torque due to the unidirectional clutch 44 is such that the nut 34 can turn in forced rotation when necessary. It will be noted that the interposition of the annular component 60 between the helical compression spring 58 and the nut 34 also avoids, owing to the annular component 60 being immobilised in rotation, the nut 34 being put into rotation by the spring 58, given that it is known that when a helical spring is compressed or extended it causes a relative rotation of its two ends.

It is clear that the embodiment described does not limit the invention and that modification can be carried out without departing from the framework of the present invention, for example the control device 62 may have flat surfaces positioned facing one another, the unidirectional clutch may be constructed by means of friction springs and, lastly, the reaction component 24 may be replaced by another control piston acting upon another friction component.

I claim:

1. A brake actuator with automatic adjustment of the type comprising a screw-and-nut actuating mechanism the lengthening of which is controlled by a combined system having a screw-and-nut of reversible pitch mounted within a fixed and a unidirection clutch, operatively connected between said nut and axial body, which is sensitive to relative axial movement between a control piston and said fixed body which houses the control piston, characterized in that the brake actuator comprises a device for preventing rotation of the nut of the actuating mechanism and for allowing forced rotation of the nut beyond a predetermined value of torque, the control device comprising two surfaces facing one another and pushed into friction engagement against one another, one surface fixed firmly to the nut and the other surface immobilized rotationally relative to the fixed body, the other surface formed on an annular component comprising at least one projection entering into an axial groove formed in the control piston, and the control piston immobilized rotationally relative to the body by means of a fork connected to a sleeve of the control piston and fork guided by a reaction component which is fixed firmly to the body.

2. The brake actuator according to claim 1, characterized in that a compression spring pushes the surfaces against one another and into said friction engagement which defines the predetermine value of torque beyond which the nut is capable is turning by forced rotation.

3. The brake actuator according to claim 2, characterized in that the surfaces are frustoconical and coaxial relative to one another.

4. The brake actuator according to claim 2, characterized in that the spring bears against a guide component which is fixed axially relative to the body.

5. The brake actuator according to claim 1, wherein the control piston comprises the sleeve engaged by a pressure component, the sleeve having the axial groove which receives the projection of the annular component.

* * * * *